No. 628,549. Patented July 11, 1899.
G. E. POOLER.
HARNESS ATTACHMENT.
(Application filed Aug. 17, 1897.)
(No Model.)

Witnesses
Inventor
George E. Pooler,
by John Wedderburn,
Attorney

UNITED STATES PATENT OFFICE.

GEORGE E. POOLER, OF MOUNT VERNON, IOWA.

HARNESS ATTACHMENT.

SPECIFICATION forming part of Letters Patent No. 628,549, dated July 11, 1899.

Application filed August 17, 1897. Serial No. 648,547. (No model.)

*To all whom it may concern:*

Be it known that I, GEORGE E. POOLER, a citizen of the United States, residing at Mount Vernon, in the county of Linn and State of Iowa, have invented certain new and useful Improvements in Harness Attachments; and I do hereby declare the following to be a full, clear, and exact description of the invention, such as will enable others skilled in the art to which it appertains to make and use the same.

This invention is intended as a harness attachment adapted to support the lines upon the horse's hips when driving, preventing them from slipping down upon the sides of the horse's hips and engaging with other parts of the harness. It also preserves the proper position of the lines when driving with what is known as "slack rein."

The invention consists in the features of construction hereinafter described and specifically claimed.

Figure 1:
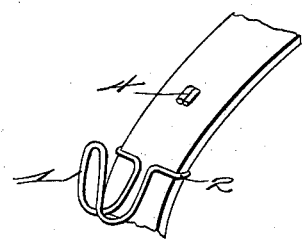
Figure 2:
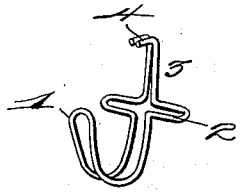

In the accompanying drawings, forming a part of this specification, Figure 1 is a perspective view of a portion of a harness provided with the attachment in accordance with the invention. Fig. 2 is a perspective view of the attachment in detail and before it is applied to the harness.

The attachment comprises a hook 1, that is supported by the loop 2. The loop 2 is adapted to receive the strap to which the device is to be secured. Continuous with the loop and extending under the hook are the arms 3, with points turned upward toward the hook. In practice it is intended to fasten the device in pairs to one of the straps of the harness that pass over the horse's hips and which serve to keep the breech-strap in place. The device is placed upon this strap a little distance on each side of the center line of the harness or the center of the horse's back, the points of the two hooks facing each other. To place the device upon the strap, the arms are sprung apart and the strap embraced by the loop. An opening is then made through the strap, the points of the arms are passed through the opening, and the points bent down upon the face of the strap, which serves to hold the attachment securely in place, as is obvious. A substantial rein guide and support is thus formed upon the top or upper face of the hip-strap in which the lines can rest, whether in driving or not, and from which the lines can be quickly removed when occasion requires. By the use of a device of this kind a very objectionable feature of driving is avoided—namely, the lines slipping below the horse's tail, as is obvious. The device adjusts itself perfectly to all sizes of straps used for hip-straps.

Whether the arms 3 extend under the hook or in the opposite direction, the principal use and construction is substantially the same.

What I claim as new, and desire to secure by Letters Patent, is—

A rein-guard constructed of a piece of wire bent centrally upon itself, and then bent to form a hook, the wire at the end of the hook-shank being bent in opposite directions then curved toward each other to form a loop for a strap, the plane of the loop being at right angles to the shank of the hook, the wires being then brought together and bent parallel to the hook-shank, and the ends of the wire being bent over toward the loop to form a means for engaging a strap, substantially as described.

In testimony whereof I have signed this specification in the presence of two subscribing witnesses.

GEORGE E. POOLER.

Witnesses:
C. M. SESSIONS,
J. W. KEPLER.